(12) United States Patent
Nogawa (10) Patent No.: US 9,422,851 B2
(45) Date of Patent: Aug. 23, 2016

(54) EXHAUST GAS PURIFICATION APPARATUS FOR AN INTERNAL COMBUSTION ENGINE

(75) Inventor: Shinichiro Nogawa, Mishima (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/420,203

(22) PCT Filed: Aug. 8, 2012

(86) PCT No.: PCT/JP2012/070203
§ 371 (c)(1),
(2), (4) Date: Feb. 23, 2015

(87) PCT Pub. No.: WO2014/024274
PCT Pub. Date: Feb. 13, 2014

(65) Prior Publication Data
US 2015/0218994 A1    Aug. 6, 2015

(51) Int. Cl.
*F01N 3/20* (2006.01)
*F02D 41/02* (2006.01)
*F02D 41/00* (2006.01)
*F01N 11/00* (2006.01)

(52) U.S. Cl.
CPC ............ *F01N 3/208* (2013.01); *F01N 11/00* (2013.01); *F02D 41/0055* (2013.01); *F02D 41/0235* (2013.01); *F02D 41/0275* (2013.01); *Y02T 10/47* (2013.01)

(58) Field of Classification Search
CPC ............ F01N 3/0842; F01N 13/009; F01N 2560/025; F01N 3/0885; F01N 2570/14; F02D 41/0052; F02D 41/0055; F02D 41/0275; F02M 2025/0762
See application file for complete search history.

(56) References Cited

U.S. PATENT DOCUMENTS

| | | | |
|---|---|---|---|
| 2004/0076565 A1* | 4/2004 | Gandhi | B01D 53/8631 423/235 |
| 2005/0022506 A1 | 2/2005 | Nishizawa et al. | |
| 2007/0256405 A1* | 11/2007 | Gabe | B01D 53/9431 60/274 |

FOREIGN PATENT DOCUMENTS

| | | |
|---|---|---|
| EP | 0952321 A2 | 10/1999 |
| EP | 0952323 A2 | 10/1999 |
| EP | 0982486 A2 | 3/2000 |

(Continued)

*Primary Examiner* — Jonathan Matthias
(74) *Attorney, Agent, or Firm* — Kenyon & Kenyon LLP (57) ABSTRACT

An amount of NOx discharged from an internal combustion engine at the time of reducing the NOx stored in an NOx storage reduction catalyst is decreased. In an exhaust gas purification apparatus for an internal combustion engine which includes an NOx storage reduction catalyst arranged in an exhaust passage of the internal combustion engine for storing NOx in exhaust gas and reducing the NOx when an air fuel ratio of the exhaust gas is equal to or less than a stoichiometric air fuel ratio, an air fuel ratio control unit to change the air fuel ratio of the exhaust gas in the internal combustion engine, and an EGR device connecting between the exhaust passage and an intake passage of the internal combustion engine for supplying a part of the exhaust gas to the intake passage as an EGR gas, provision is made for an EGR ratio control unit that controls the EGR device in such a manner that in cases where the NOx stored in the NOx storage reduction catalyst is reduced by changing the air fuel ratio in the internal combustion engine, an EGR ratio becomes higher when the target air fuel ratio is low than when the target air fuel ratio is high.

9 Claims, 8 Drawing Sheets

(56) References Cited

FOREIGN PATENT DOCUMENTS

| | | |
|---|---|---|
| EP | 1077319 A2 | 2/2001 |
| JP | 2000054824 A | 2/2000 |
| JP | 2000-130202 A | 5/2000 |
| JP | 2001-123858 A | 5/2001 |
| JP | 2001-329887 A | 11/2001 |
| JP | 2004-340004 A | 12/2004 |
| JP | 2005-048745 A | 2/2005 |
| JP | 2007-285305 A | 11/2007 |
| JP | 2010-168954 A | 8/2010 |
| JP | 2010-203421 A | 9/2010 |

* cited by examiner

| A/F | EGR RATIO |
|---|---|
| 14 | 25 |
| 18 | 20 |
| 20 | 17 |
| 22 | 15 |
| 24 | 6 |
| 27 | 0 |

EXHAUST GAS PURIFICATION APPARATUS FOR AN INTERNAL COMBUSTION ENGINE

CROSS-REFERENCE TO RELATED APPLICATION

This is a national phase application based on the PCT International Patent Application No. PCT/JP2012/070203 filed Aug. 8, 2012, the entire contents of which are incorporated herein by reference.

TECHNICAL FIELD

The present invention relates to an exhaust gas purification apparatus for an internal combustion engine.

BACKGROUND ART

There has been known a technology in which an NOx storage reduction catalyst (hereinafter referred to as an NSR catalyst) is arranged in an exhaust passage of an internal combustion engine. This NSR catalyst serves to occlude or store NOx contained in an incoming exhaust gas when the oxygen concentration of the incoming exhaust gas is high, and to reduce the occluded or stored NOx when the oxygen concentration of the incoming exhaust gas becomes low and when a reducing agent exists. In order to decrease the oxygen concentration of the exhaust gas flowing into the NSR catalyst as well as to supply the reducing agent to the NSR catalyst, rich spike control is carried out in which the internal combustion engine is driven to operate temporarily at an air fuel ratio equal to or less than a stoichiometric air fuel ratio.

In addition, there has also been known a technique in which when the NOx stored by the NSR catalyst is reduced, the concentration of oxygen in the exhaust gas is decreased by increasing an amount of fuel injection so as to adjust the air fuel ratio to a value in the vicinity of the stoichiometric air fuel ratio, after enhancing an EGR (exhaust gas recirculation) ratio to a predetermined value (for example, refer to a first patent literature). In this technology, the variation of the air fuel ratio in a combustion chamber is suppressed by taking into consideration a response delay of an EGR gas.

Moreover, there has been known a technology in which in cases where a determination is made that there is an ignition delay, when the air fuel ratio of the exhaust gas is richer than the stoichiometric air fuel ratio, the ignition delay is suppressed by controlling the EGR ratio to about 15% (for example, refer to a second patent literature).

Further, there has also been known a technology in which when a required amount of injection has increased, an actual amount of injection is made to increase gradually, and at the same time an EGR valve is made to open gradually (for example, refer to a third patent literature).

Furthermore, there has also been known a technology in which when post injection is carried out, a target air fuel ratio for feedback control is decreased and an amount of recirculation of the exhaust gas is increased, whereas in a predetermined period of time from the start of the execution of this post injection, an amount of operation for feedback is made small (for example, refer to a fourth patent literature).

However, when rich spike control is carried out in an internal combustion engine which is operated at a lean air fuel ratio, the combustion temperature becomes high due to an increase in the amount of fuel, so the amount of discharge of NOx may increase. That is, in spite of reducing the NOx stored in the NSR catalyst, the amount of NOx discharged from the internal combustion engine may increase. For this reason, there is a fear that NOx may not be treated fully by the NSR catalyst, and so NOx may pass through the NSR catalyst. Even if the EGR ratio has been enhanced to the predetermined value as in the past, there will be a fear that NOx may not be decreased to a sufficient extent.

PRIOR ART REFERENCES

Patent Literatures

[First Patent Literature] Japanese patent laid-open publication No. 2001-123858
[Second Patent Literature] Japanese patent laid-open publication No. 2010-203421
[Third Patent Literature] Japanese patent laid-open publication No. 2000-130202
[Fourth Patent Literature] Japanese patent laid-open publication No. 2001-329887

SUMMARY OF THE INVENTION

Problems to be Solved by the Invention

The present invention has been made in view of the problems as mentioned above, and the object of the invention is to decrease an amount of NOx discharged from an internal combustion engine at the time of reducing the NOx stored in an NOx storage reduction catalyst.

Means for Solving the Problems

In order to achieve the above-mentioned object, an exhaust gas purification apparatus for an internal combustion engine according to the present invention includes:

an NOx storage reduction catalyst that is arranged in an exhaust passage of the internal combustion engine, stores NOx in exhaust gas, and reduces the NOx when an air fuel ratio of the exhaust gas is equal to or less than a stoichiometric air fuel ratio;

an air fuel ratio control unit that changes the air fuel ratio in said internal combustion engine; and an EGR device that connects between the exhaust passage and an intake passage of said internal combustion engine, and supplies a part of the exhaust gas to the intake passage as an EGR gas;

wherein provision is made for an EGR ratio control unit that controls said EGR device in such a manner that in cases where the NOx stored in said NOx storage reduction catalyst is reduced by changing the air fuel ratio in said internal combustion engine, an EGR ratio, which is a ratio (i.e., a proportion) of the EGR gas in intake air of the internal combustion engine, becomes higher when the target air fuel ratio is low than when the target air fuel ratio is high.

Here, the NOx stored in said NOx storage reduction catalyst (NSR catalyst) can be reduced by changing the air fuel ratio in the internal combustion engine into a value equal to or smaller than the stoichiometric air fuel ratio. Then, when the target air fuel ratio is brought close to a rich air fuel ratio, the combustion temperature becomes high, thus making it easy to generate NOx. In contrast to this, the generation of NOx can be suppressed by making the EGR ratio high. That is, the generation of NOx can be suppressed by controlling the EGR device in such a manner that the EGR ratio becomes higher when the target air fuel ratio is low than when the target air fuel ratio is high. Here, note that the lower the target air fuel ratio, the higher the EGR ratio may also be made. In addition, the lower the target air fuel ratio, the higher the EGR ratio may also be made in a stepwise manner. That is, in cases where the target air fuel ratio becomes low or decreases, the EGR ratio before the change of the target air fuel ratio has only to be equal to or more than the EGR ratio after the change of the target air fuel ratio. Moreover, the relation between the target air fuel ratio and the EGR ratio may be linear, or may be nonlinear. The target air fuel ratio may also be set as an air fuel ratio which can reduce NOx in the NOx storage reduction catalyst, and which is equal to or less than the stoichiometric air fuel ratio.

In the present invention, said EGR ratio control unit can control such that in the case where the target air fuel ratio is equal to or higher than a specified air fuel ratio which is a rich air fuel ratio, the EGR ratio becomes higher when the target air fuel ratio is low than when the target air fuel ratio is high, whereas in the case where the target air fuel ratio is less than said specified air fuel ratio, the EGR ratio becomes lower when the target air fuel ratio is low than when the target air fuel ratio is high.

Here, there is a fear that when the target air fuel ratio is too low, a misfire may occur at the time of supplying the EGR gas. On the other hand, in such a state where the air fuel ratio is low, the combustion temperature is low, so the generation of NOx is suppressed. Accordingly, the EGR ratio may be made to decrease. For this reason, in the case where the target air fuel ratio is less than the specified air fuel ratio, the EGR ratio may be made lower when the target air fuel ratio is low than when the target air fuel ratio is high. Then, only in the case where the target air fuel ratio is equal to or more than the specified air fuel ratio, the EGR ratio may be made higher when the target air fuel ratio is low than when the target air fuel ratio is high. The specified air fuel ratio is an air fuel ratio in which when the target air fuel ratio becomes richer than that, a misfire will occur unless the EGR ratio is decreased. In addition, the prescribed air fuel ratio may be set to be an upper limit value of an air fuel ratio in which a misfire will occur if the EGR ratio is made higher when the target air fuel ratio is low than when the target air fuel ratio is high. Here, note that the specified air fuel ratio may be set with a certain amount of margin, so that in the case where the target air fuel ratio is less than the specified air fuel ratio, even if the EGR ratio is made higher when the target air fuel ratio is low than when the target air fuel ratio is high, a misfire will not occur immediately. In this manner, it is possible to suppress the occurrence of a misfire at the time when the target air fuel ratio is low.

In the present invention, said EGR ratio control unit can control such that in cases where the fuel air ratio in said internal combustion engine is further made to change in the course of reducing the NOx stored in said NOx storage reduction catalyst by changing the air fuel ratio in said internal combustion engine, the EGR ratio is adjusted according to the highest air fuel ratio in the course of reducing the NOx.

Here, note that in the course of reducing the NOx stored in the NSR catalyst, the gas of an air fuel ratio equal to or less than the stoichiometric air fuel ratio may be made to discharge from the internal combustion engine. At this time, the air fuel ratio may be made to change within a range equal to or less than the stoichiometric air fuel ratio. For example, the reduction of NOx is hardly carried out as long as oxygen is stored in the NSR catalyst, and hence, the air fuel ratio is first made relatively low, so that the oxygen stored in the NSR catalyst is made to release therefrom. Then, the air fuel ratio is thereafter made relatively high, so that the reduction of NOx is carried out. At this time, the EGR ratio may be made to change according to the changing target air fuel ratio.

However, the changing (i.e., increasing or decreasing) of the EGR gas may not be made in time due to a response delay of the EGR gas. In such a case, the change over time of the target air fuel ratio is obtained, before actually changing the air fuel ratio. Then, the EGR ratio is set according to the highest of this target air fuel ratio. If the EGR ratio is set according to a low air fuel ratio, there will be a fear that the EGR gas may become excessive, thus causing a misfire at the time of the low air fuel ratio. On the other hand, by setting the EGR ratio according to a high air fuel ratio, the EGR gas can be suppressed from becoming excessive at the time of the low air fuel ratio, thus making it possible to suppress the occurrence of a misfire. Here, note that "the highest air fuel ratio" may also be as an air fuel ratio at which the NOx stored in the NSR catalyst is made to be reduced. In addition, an air fuel ratio lower than the highest air fuel ratio may also be as an air fuel ratio at which the oxygen stored in the NSR catalyst is made to be released. Also, note that the air fuel ratio in the case of making the target air fuel ratio high for only a short period of time in which the amount of discharge of NOx does not pose any problem may be excluded.

In the present invention, said EGR ratio control unit can control such that in cases where the fuel air ratio in said internal combustion engine is made to further change in the course of reducing the NOx stored in said NOx storage reduction catalyst by changing the air fuel ratio in said internal combustion engine, the EGR ratio is adjusted according to an average value of the air fuel ratio in the course of reducing the NOx.

In such a case, too, the change over time of the target air fuel ratio in the NSR catalyst is obtained, before actually changing the air fuel ratio. Then, the EGR ratio is set according to the average value of the target air fuel ratio at the time of reducing the NOx stored in the NOx storage reduction catalyst. As a result of this, it becomes possible to carry out the decrease in the amount of discharge or emission of NOx and the suppression of a misfire. Here, note that the air fuel ratio in the case of making the target air fuel ratio high for only a short period of time in which the amount of discharge of NOx does not pose any problem or in the case of making the target air fuel ratio low for only a short period time in which a misfire does not pose any problem may be excluded.

In the present invention, said EGR ratio control unit can control such that a period of time in which the EGR ratio becomes higher when said target air fuel ratio is low than when said target air fuel ratio is high is made shorter than a period of time in which the NOx stored in said NOx storage reduction catalyst is reduced by changing the air fuel ratio in said internal combustion engine.

In this manner, by making relatively short the period of time in which the EGR ratio becomes higher when the target air fuel ratio is low than when the target air fuel ratio is high, it is possible to suppress the deterioration of the combustion state due to the excessive supply of the EGR gas. In addition, in cases where an NOx selective catalytic reduction catalyst (hereinafter, referred to as an SCR catalyst) is provided at the downstream side of the NSR catalyst, the reducing agent can be supplied to the SCR catalyst, as will be described below.

That is, in the present invention, an NOx selective catalytic reduction catalyst for reducing NOx in a selective manner can be arranged in the exhaust passage at the downstream side of said NOx storage reduction catalyst, and said EGR ratio control unit can control such that within the period of time in which the NOx stored in said NOx storage reduction catalyst is reduced by changing the air fuel ratio in said internal combustion engine, and outside the period of time in which the EGR ratio becomes higher when said target air fuel ratio is low than when said target air fuel ratio is high, the EGR ratio is made to decrease more than in the period of time in which the EGR ratio becomes higher when said target air fuel ratio is low than when said target air fuel ratio is high, or the supply of the EGR gas is stopped.

In this case, in the present invention, said EGR ratio control unit can control such that NOx is made to be discharged from the internal combustion engine thereby to generate $NH_3$ in said NOx storage reduction catalyst, by decreasing the EGR ratio or stopping the supply of the EGR gas in the course of reducing the NOx stored in said NOx storage reduction catalyst by changing the air fuel ratio in said internal combustion engine, and NOx is made to be reduced in said NOx selective catalytic reduction catalyst by supplying the $NH_3$ to said NOx selective catalytic reduction catalyst.

That is, at the time of reducing the NOx stored in the NSR catalyst, the EGR ratio is made higher when the target air fuel ratio is low than when the target air fuel ratio is high, but during the reduction of the NOx, this EGR ratio may be further changed into a lower one. Here, when NOx is not discharged from the internal combustion engine, $NH_3$ will not substantially be generated in the NSR catalyst, so there is a fear that the reducing agent may run short or becomes insufficient in the NOx selective catalytic reduction catalyst (hereinafter, also referred to as an SCR catalyst). In that case, it becomes difficult to reduce the NOx flowing out from the NSR catalyst, in the SCR catalyst. That is, if the EGR ratio is made higher when the target air fuel ratio is low than when the target air fuel ratio is high, there will be a fear that the reducing agent may run short in the SCR catalyst.

In contrast to this, by decreasing the EGR ratio or stopping the supply of the EGR gas, in the course of reducing the NOx stored in the NSR catalyst, the NOx can be made to be discharged from the internal combustion engine. With this NOx, $NH_3$ is generated in the NSR catalyst. Then, this $NH_3$ serves as a reducing agent in the SCR catalyst. As a result of this, in the SCR catalyst, it becomes possible to reduce the NOx. Here, note that the period of time in which the EGR ratio is made higher when the target air fuel ratio is low than when the target air fuel ratio is high may be decided so that the rate of NOx reduction in the SCR catalyst falls within an allowable range. In addition, the EGR ratio after decreased may be decided in such a manner that the rate of NOx reduction in the SCR catalyst falls within the allowable range.

In addition, in the present invention, said EGR ratio may be set according to a combustion limit.

That is, in the case where the EGR ratio is made higher when the target air fuel ratio is low than when the target air fuel ratio is high, the EGR ratio may also be made high up to the combustion limit. The combustion limit may also be set as a boundary for whether a misfire occurs or not. In addition, the EGR ratio may also be set to a value which has a margin with respect to the combustion limit. In this manner, the EGR ratio can be made as high as possible, by setting the EGR ratio according to the combustion limit. As a result of this, it is possible to suppress the occurrence of NOx to a further extent.

In the present invention, said EGR ratio control unit can control such that a target value of a gas fuel ratio, which is a ratio of an amount of gas and an amount of fuel in a cylinder, is obtained from an air fuel ratio, which is a ratio of an amount of fresh air and the amount of fuel in the cylinder, according to a predetermined relation, and the EGR ratio is adjusted according to the target value of the gas fuel ratio thus obtained.

Here, note that the EGR ratio can also be obtained from the air fuel ratio according to a predetermined relation. In this manner, the adjustment of the EGR gas becomes easy, by setting the EGR ratio according to the predetermined relation.

In the present invention, said EGR ratio control unit can control such that in cases where an activated state of said NOx storage reduction catalyst is a predetermined activated state, the EGR ratio is made to decrease, or the supply of the EGR gas is stopped.

The predetermined activated state is a case where the temperature of the NOx storage reduction catalyst is equal to or less than an activation temperature, or is a case where the extent of the deterioration of the NOx storage reduction catalyst exceeds an allowable range, etc., and means a case where a desired purification (removal or reduction) rate can not be obtained in the NOx storage reduction catalyst. In such a case, the effect or advantage obtained is greater when increasing the amount of fuel supply to the internal combustion engine so as to raise the temperature of the catalyst, than when decreasing the amount of NOx discharged from the internal combustion engine. That is, by decreasing the EGR ratio or stopping the supply of the EGR gas so as to increase the amount of fuel, the amount of NOx discharged from the internal combustion engine is increased, but a larger amount of NOx can be removed or reduced in the catalyst, thus making it possible to decrease the amount of NOx flowing out from the catalyst.

Effect of the Invention

According to the present invention, it is possible to decrease the amount of NOx discharged from the internal combustion engine at the time of reducing the NOx stored in the NOx storage reduction catalyst.

MODES FOR CARRYING OUT THE INVENTION

Hereinafter, modes for carrying out the present invention will be exemplarily described in detail based on embodiments with reference to the attached drawings. However, the dimensions, materials, shapes, relative arrangements and so on of component parts described in the embodiments are not intended to limit the scope of the present invention to these alone in particular as long as there are no specific statements.

First Embodiment

Figure 1:
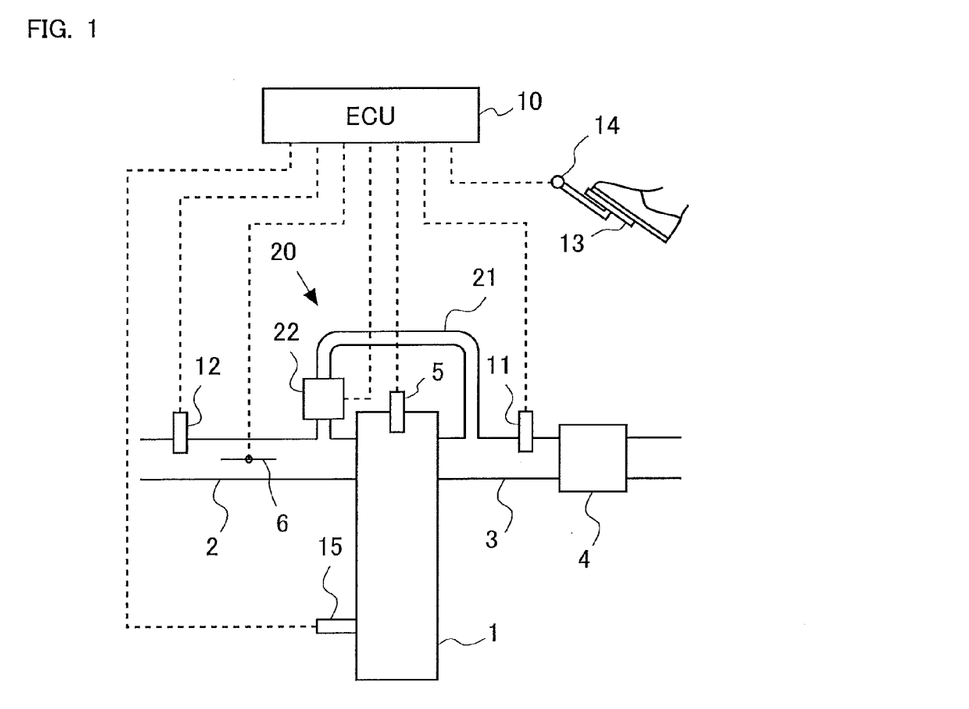
FIG. 1 is a view showing the schematic construction of an internal combustion engine as well as its intake and exhaust systems according to a first and a second embodiment of the present invention.

FIG. 1 is a view showing the schematic construction of an internal combustion engine as well as its intake and exhaust systems according to an embodiment of the present invention. An internal combustion engine 1 shown in FIG. 1 is a gasoline engine, but it may be a diesel engine. The internal combustion engine 1 is installed on a vehicle, for example.

An intake passage 2 and an exhaust passage 3 are connected to the internal combustion engine 1. In the middle of the exhaust passage 3, there is arranged an NOx storage reduction catalyst 4 (hereinafter, referred to as an NSR catalyst 4). This NSR catalyst 4 serves to occlude or store NOx contained in an exhaust gas when the concentration of oxygen in the exhaust gas is high, and to reduce the occluded or stored NOx when the concentration of oxygen in the exhaust gas becomes low and when a reducing agent exists. Here, note that the expression "when the concentration of oxygen in the exhaust gas is high" may also be replaced by "at the time of a lean air fuel ratio". In addition, the expression "when the concentration of oxygen in the exhaust gas becomes low and when a reducing agent exists" may also be replaced by "when the air fuel ratio is equal to or less than a stoichiometric air fuel ratio". As the reducing agent to be supplied to the NSR catalyst 4, there can be used HC or CO which is unburnt fuel discharged from the internal combustion engine 1.

A throttle valve 6 for adjusting the channel cross section of the intake passage 2 thereby to adjust the amount of intake air to be supplied to the internal combustion engine 1 is arranged in the middle of the intake passage 2.

Moreover, the internal combustion engine 1 is equipped with an EGR device 20 that serves to supply a part of the exhaust gas flowing through the exhaust passage 3 to the intake passage 2 as an EGR gas. This EGR device 20 is constructed to be provided with an EGR passage 21 that connects between the exhaust passage 3 at the upstream side of the NSR catalyst 4 and the intake passage 2 at the down-stream side of the throttle valve 6, and an EGR valve 22 that adjusts the channel cross section of the EGR passage 21.

Further, an air fuel ratio sensor 11 for measuring the air fuel ratio of the exhaust gas is mounted on the exhaust passage 3 at a location upstream of the NSR catalyst 4. The air fuel ratio of the exhaust gas discharged from the internal combustion engine 1 or the air fuel ratio of the exhaust gas flowing into the NSR catalyst 4 can be measured by means of this air fuel ratio sensor 11. Also, an air flow meter 12 for measuring the amount of intake air to be sucked into the internal combustion engine 1 is mounted on the intake passage 2 at a location upstream of the throttle valve 6.

In addition, on the internal combustion engine 1, there is mounted a fuel injection valve 5 for supplying or injecting fuel into a corresponding cylinder.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

In addition, besides the above-mentioned sensors, an accelerator opening sensor 14, which serves to detect an engine load by outputting an electrical signal corresponding to an amount of depression by which a driver depressed an accelerator pedal 13, and a crank position sensor 15, which serves to detect the number of revolutions per unit time of the engine, are connected to the ECU 10 through electrical wiring, and the output signals of these variety of kinds of sensors are inputted to the ECU 10.

On the other hand, the injection valve 5, the throttle valve 6 and the EGR valve 22 are connected to the ECU 10 through electrical wiring, so that the opening and closing timing of the injection valve 5, the degree of opening of the throttle valve 6 and the degree of opening of the EGR valve 22 are controlled by means of the ECU 10.

For example, the ECU 10 sets a target air fuel ratio according to an operating state of the internal combustion engine 1. Here, note that in the internal combustion engine 1 according to this embodiment, a lean burn operation is carried out in which the target air fuel ratio is set to a lean air fuel ratio. However, at the time of high load operation, etc., the internal combustion engine 1 may be operated at an air fuel ratio in the vicinity of the stoichiometric air fuel ratio. In addition, the ECU 10 decides a required amount of intake air from the accelerator opening degree measured by the accelerator opening sensor 14, and the number of engine revolutions per unit time measured by the crank position sensor 15. Then, the degree of opening of the throttle valve 6 is controlled so that the amount of intake air detected by the air flow meter 12 is adjusted to the required amount of intake air. Moreover, the ECU 10 decides the amount of fuel injected from the injection valve 5 so that the air fuel ratio in the cylinder is adjusted to the target air fuel ratio. The degree of opening of the throttle valve 6 or the amount of fuel injected from the injection valve 5 may be controlled in a feedback manner so that the air fuel ratio of the exhaust gas measured by the air fuel ratio sensor 11 is adjusted to the target air fuel ratio.

Moreover, the ECU 10 carries out a reduction treatment to reduce the NOx stored in the NSR catalyst 4. At the time of reducing the NOx stored in the NSR catalyst 4, so-called rich spike control is carried out in which the air fuel ratio of the exhaust gas flowing into the NSR catalyst 4 is made to decrease to a predetermined rich air fuel ratio, by adjusting at least one of the amount of fuel to be injected from the injection valve 5 and the degree of opening of the throttle valve 6.

At this time, the amount of intake air or the amount of fuel injection is adjusted so that the air fuel ratio of the exhaust gas discharged from the internal combustion engine 1 becomes a value from 12 to 14.1, for example. Here, note that in this embodiment, the ECU 10, which carries out rich spike control, corresponds to an air fuel ratio control unit in the present invention.

This rich spike control is carried out, for example, in cases where the amount of NOx stored in the NSR catalyst 4 becomes a predetermined amount. The amount of NOx stored in the NSR catalyst 4 is calculated, for example, by integrating a difference between the amount of NOx flowing into the NSR catalyst 4 and the amount of NOx flowing out of the NSR catalyst 4. The amount of NOx flowing into the NSR catalyst 4 and the amount of NOx flowing out of the NSR catalyst 4 can be detected by the provision of sensors. In addition, rich spike control may be carried out according to the distance of travel of the vehicle on which the internal combustion engine 1 is installed.

Further, the ECU 10 adjusts the degree of opening of the EGR valve 22 according to the operating state of the internal combustion engine 1. For example, the relation among the degree of opening of the EGR valve 22, the number of engine revolutions per unit time and the engine load may be obtained in advance by experiments, simulations or the like, and then may be stored into the ECU 10, while being made into a map. In addition, the ECU 10 adjusts the EGR ratio by adjusting the degree of opening of the EGR valve 22 or the degree of opening of the throttle valve 6. Here, note that the EGR ratio is a mass ratio of the EGR gas to the whole gas sucked into the internal combustion engine 1. The mass of the whole gas sucked into the internal combustion engine 1 is the sum of the mass of fresh air and the mass of the EGR gas.

Then, the ECU 10 adjusts the EGR ratio according to the target air fuel ratio, at the time of carrying out rich spike control. Here, note that in this embodiment, the ECU 10, which adjusts the EGR ratio, corresponds to an EGR ratio control unit in the present invention.

Figure 2:
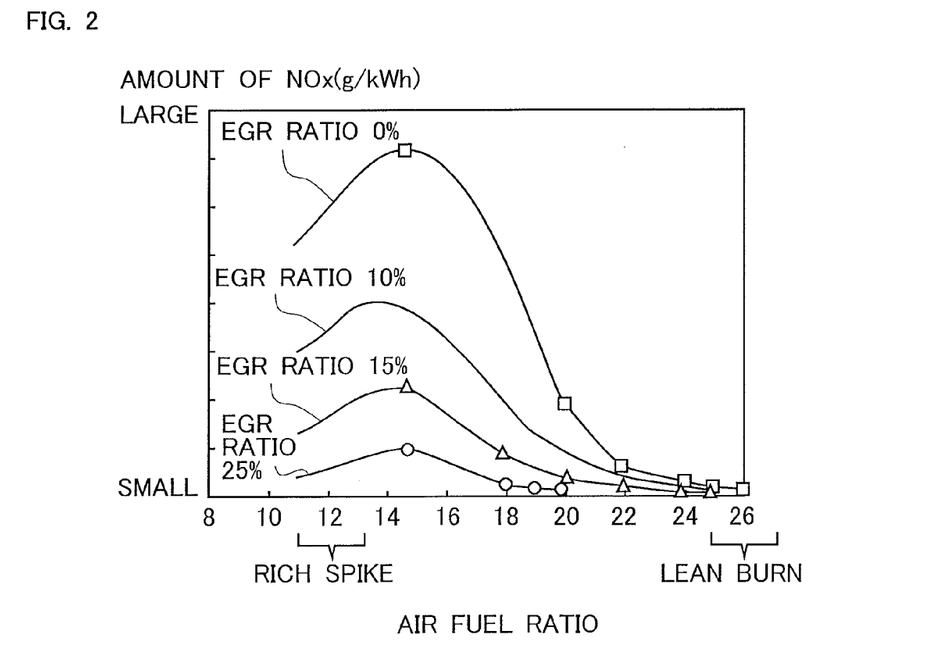
FIG. 2 is a view showing the relation between an air fuel ratio and an amount of NOx in an exhaust gas discharged from the internal combustion engine, for each EGR ratio.

Here, FIG. 2 is a view showing the relation between the air fuel ratio and the amount of NOx in the exhaust gas discharged from the internal combustion engine 1, for each EGR ratio. This FIG. 2 shows the relation at the time of a steady state operation. "RICH SPIKE" in FIG. 2 indicates the target air fuel ratio at the time of rich spike control. In addition, "LEAN BURN" in FIG. 2 indicates the target air fuel ratio at the time of a lean burn operation.

As shown in FIG. 2, the lower the EGR ratio, the larger the amount of discharge of NOx from the internal combustion engine 1 becomes, whereas the higher the EGR ratio, the smaller the amount of discharge of NOx from the internal combustion engine 1 becomes. Then, in each EGR ratio, there exists a local maximal value, and the amount of NOx discharge becomes the largest in the vicinity of the stoichiometric air fuel ratio. For this reason, the richer than the local maximum value of the EGR ratio becomes the air fuel ratio, the smaller becomes the amount of NOx discharge, and the leaner than the local maximum value of the EGR ratio becomes the air fuel ratio, the smaller becomes the amount of NOx discharge. For example, the leaner or richer than the vicinity of the stoichiometric air fuel ratio becomes the air fuel ratio, the lower becomes the combustion temperature, as a result of which the generation of NOx is suppressed.

On the other hand, when the EGR ratio is made high, the combustion state will deteriorate. For this reason, an upper limit value of the EGR ratio (hereinafter, referred to as an upper limit EGR ratio) which can be set is decided by the combustion state. That is, the higher the EGR ratio, the more the amount of discharge of NOx can be decreased, but when the EGR ratio is made too high, the combustion state will deteriorate. In addition, the upper limit EGR ratio also changes with the air fuel ratio. In the case of a lean air fuel ratio, the higher the air fuel ratio, the lower the upper limit EGR ratio becomes.

Then, until reaching the upper limit EGR ratio, the higher becomes the EGR ratio, the smaller becomes the amount of NOx discharge. Here, at the time of rich spike control, the combustion temperature is higher than at the time of lean burn operation, and hence, the easier it is for NOx to be generated. On the other hand, at the time of rich spike control, the upper limit EGR ratio is higher than at the time of lean burn operation, so the EGR ratio can be made higher. That is, when the target air fuel ratio is low, it is easy for the amount of discharge of NOx to increase, but at this time, the amount of discharge of NOx can be decreased by making the EGR ratio high.

Accordingly, in this embodiment, at the time of rich spike control, the lower the target air fuel ratio, the higher an EGR ratio to be targeted (hereinafter, referred to as a target EGR ratio) is made.

Figure 3:
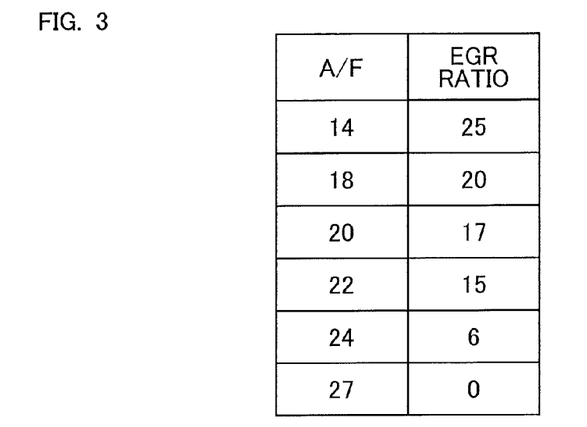
FIG. 3 is a view showing the relation between a target air fuel ratio and a target EGR ratio.
Figure 4:
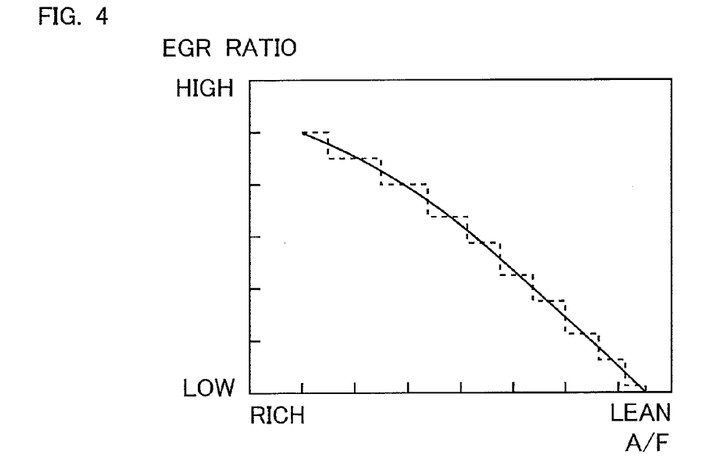
FIG. 4 is another view showing the relation between the target air fuel ratio and the target EGR ratio.

Here, FIG. 3 is a view showing the relation between the target air fuel ratio and the target EGR ratio. This relation has been obtained in advance by experiments, simulations or the like, and stored in the ECU 10. Here, note that when a target air fuel ratio is not shown in FIG. 3, a corresponding target EGR ratio may be obtained by complementing or interpolating from the relation of the target air fuel ratio and the target EGR ratio, or a target EGR ratio at the time of the nearest target air fuel ratio among the air fuel ratios shown in FIG. 3 may be used. For example, FIG. 4 is another view showing the relation between the target air fuel ratio and the target EGR ratio. This relation has been obtained in advance by experiments, simulations or the like, and stored in the ECU 10. A solid line shows a case where the target EGR ratio changes continuously according to the target air fuel ratio, and a broken line shows a case where the target EGR ratio changes in a stepwise manner according to the target air fuel ratio. These have a relation in which the lower becomes the target air fuel ratio, the higher becomes the target EGR ratio. Based on FIG. 3 or FIG. 4, the target EGR can be obtained from the target air fuel ratio.

Figure 5:
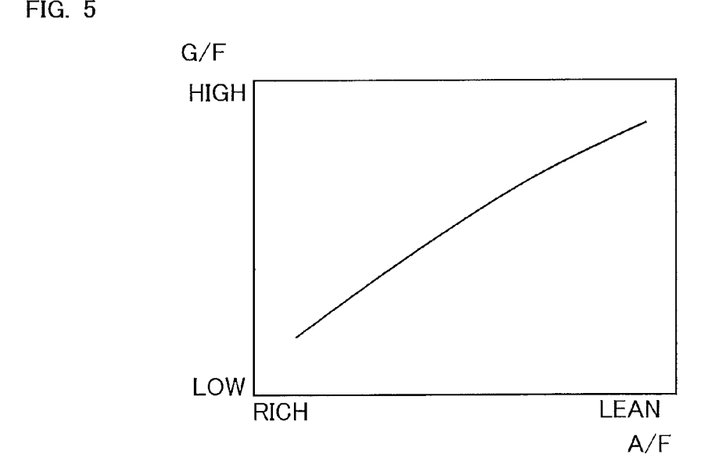
FIG. 5 is a view showing the relation between an air fuel ratio (A/F) and a gas fuel ratio (G/F).

In addition, FIG. 5 is a view showing the relation between the target air fuel ratio (A/F) and a gas fuel ratio (G/F). The air fuel ratio is a value which is obtained by dividing the mass of fresh air by the mass of fuel, whereas the gas fuel ratio is a value which is obtained by dividing the mass of gas in the cylinder by the mass of fuel. The mass of gas in the cylinder is a value which is the sum of the mass of fresh air and the mass of EGR gas.

The gas fuel ratio (G/F) can be calculated by the following expression.

$$(G/F) = (Ga + Gegr)/Gf$$

wherein (G/F) is the ratio of the amount of gas (g/s) in the cylinder to the amount of fuel (g/s); Ga is the amount of fresh air (g/s); Gegr is the amount of EGR gas (g/s); and Gf is the amount of fuel consumption (g/s). The following relation is established.

$$Gegr = Ga \cdot (Regr/(1-Regr))$$

where Regr is the EGR ratio (%). Accordingly, the gas fuel ratio (G/F) can also be obtained in the following manner.

$$(G/F) = (A/F) \cdot (1/(1-Regr))$$

where (A/F) is the ratio of fresh air (g/s) to the amount of fuel (g/s).

Accordingly the EGR ratio can be obtained by the following expression.

$$Regr=1-((A/F)/(G/F))$$

In this manner, the gas fuel ratio can be obtained from the target air fuel ratio by the use of FIG. 5, and further, the target EGR ratio can be calculated from the gas fuel ratio thus obtained. Here, note that the relation shown in FIG. 5 has been obtained in advance by experiments, simulations or the like, and stored in the ECU 10.

Then, the ECU 10 adjusts the degree of opening of the EGR valve 22 in such a manner that an actual EGR ratio becomes the target EGR ratio. Here, note that the actual EGR ratio can be obtained by means of a well-known technology. In addition, the relation between the operating state of the internal combustion engine 1 (e.g., the number of engine revolutions per unit time and the engine load) and the EGR ratio may have been obtained in advance by experiments or simulations, and stored in the ECU 10. Moreover, the relation between the operating state of the internal combustion engine 1, the target EGR ratio, and the degree of opening of the EGR valve 22 may have been obtained in advance by experiments or simulations, and stored in the ECU 10.

In addition, the target EGR ratio may be set to be the upper limit EGR ratio, or may be set to be lower than the upper limit EGR ratio, with a certain amount of margin. Here, note that by enhancing the EGR ratio as much as possible, the amount of discharge of NOx can be decreased as much as possible. That is, when the target EGR ratio is set to be the upper limit EGR ratio, the effect of decreasing NOx is high.

Here, note that during lean burn operation of the internal combustion engine 1, the supply of the EGR gas may be stopped, but the EGR gas may instead be supplied. For example, during the lean burn operation, the combustion temperature is low, and so it is easy for the temperature of the NSR catalyst 4 to become low. On the other hand, by supplying the EGR gas during the lean burn operation, it is possible to cause CO or HC to be discharged from the internal combustion engine 1. By means of this CO or HC, it is possible to raise the temperature of an oxidation catalyst or a three-way catalyst, for example, which is arranged in the exhaust passage 3. Then, the temperature of the NSR catalyst 4 can also be raised due to the rise in the temperature of these catalysts. In addition, in cases where a cooler for cooling EGR gas is provided, the EGR gas of a low temperature can be supplied, so that knocking at the time of high load operation can be suppressed.

Figure 6:
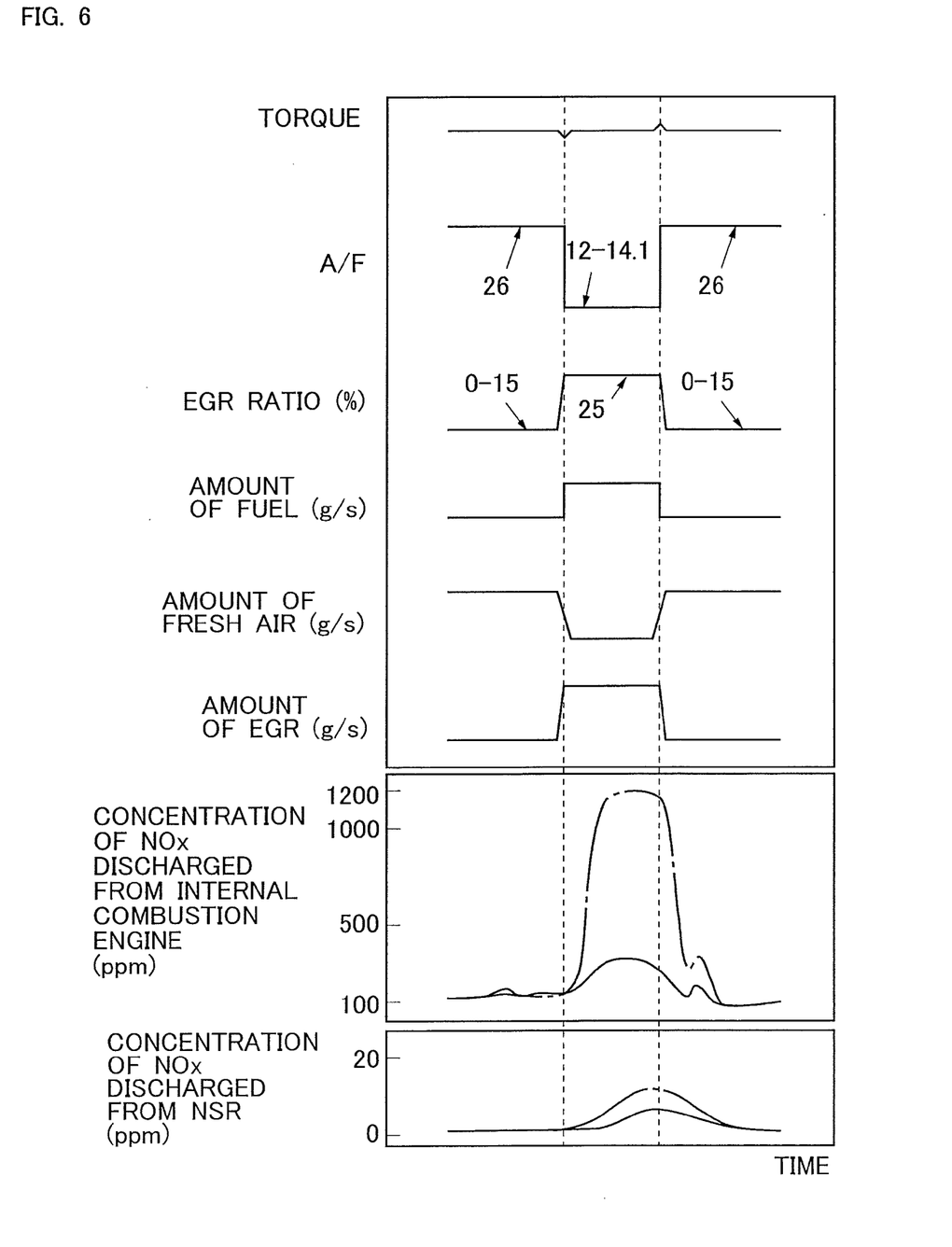
FIG. 6 is a time chart showing the changes over time of torque, an air fuel ratio (NE), an EGR ratio, an amount of fuel supplied to the internal combustion engine, an amount of fresh air, an amount of EGR, a concentration of NOx in gas discharged from the internal combustion engine, a concentration of NOx in gas discharged from an NSR catalyst, from before the execution of rich spike control until after the execution thereof.

Next, FIG. 6 is a time chart showing the changes over time of torque, the air fuel ratio (NE), the EGR ratio, the amount of fuel supplied to the internal combustion engine 1, the amount of fresh air, the amount of EGR, the concentration of NOx in the gas discharged from the internal combustion engine 1, the concentration of NOx in the gas discharged from the NSR catalyst 4, from before the execution of rich spike control until after the execution thereof. In the concentration of NOx, a solid line shows a case where at the time of rich spike control, the lower the target air fuel ratio, the higher the EGR ratio is made, and an alternate long and short dash line shows a case where the EGR ratio is set constant. Here, note that in the case of the solid line, the EGR ratio at the time of rich spike control is adjusted to 25%, and in the case of the alternate long and short dash line, the EGR ratio is adjusted to 0 to 15% at the time of rich spike control, as well as before and after that. Even in the case of the solid line, the EGR ratio is adjusted to 0 to 15%, at times other than at the time of rich spike control.

At the time of rich spike control, the amount of intake air is decreased by making small the degree of opening of the throttle valve 6, for example. In addition, the amount of fuel is increased. As a result, the air fuel ratio drops or becomes low. An amount of increase in the amount of fuel at this time is a value of the sum of an amount of fuel for compensation for a deterioration in fuel economy caused by changing of the target air fuel ratio from a lean one into a rich one, and an amount of fuel required for that changing (i.e., achieving the rich air fuel ratio). Moreover, the EGR ratio and the amount of EGR can be made to increase by making large the degree of opening of the EGR valve 22. Further, at the time of the start and the end of rich spike control, the combustion state changes to some extent, so there can be seen a change in torque. Here, note that in FIG. 6, the EGR ratio is made to increase from before the rich spike control, and the EGR ratio is made to decrease after the rich spike control, in consideration of a time lag (or delay) from the time the EGR valve 22 is opened until the time EGR gas is actually sucked into the cylinder, i.e., a response delay of the EGR gas.

Then, in cases where the EGR ratio is not changed at the time of rich spike control (i.e., in the case of the alternate long and short dash line), the concentration of NOx increases at the time of rich spike control. For this reason, NOx passes through the NSR catalyst 4, so that the concentration of NOx at the downstream side of the NSR catalyst 4 rises. On the other hand, in cases where the EGR ratio is made to increase at the time of rich spike control (in the case of the solid line), the rise in the concentration of NOx is suppressed. As a result of this, the rise in the concentration of NOx at the downstream side of the NSR catalyst 4 is suppressed.

Figure 7:
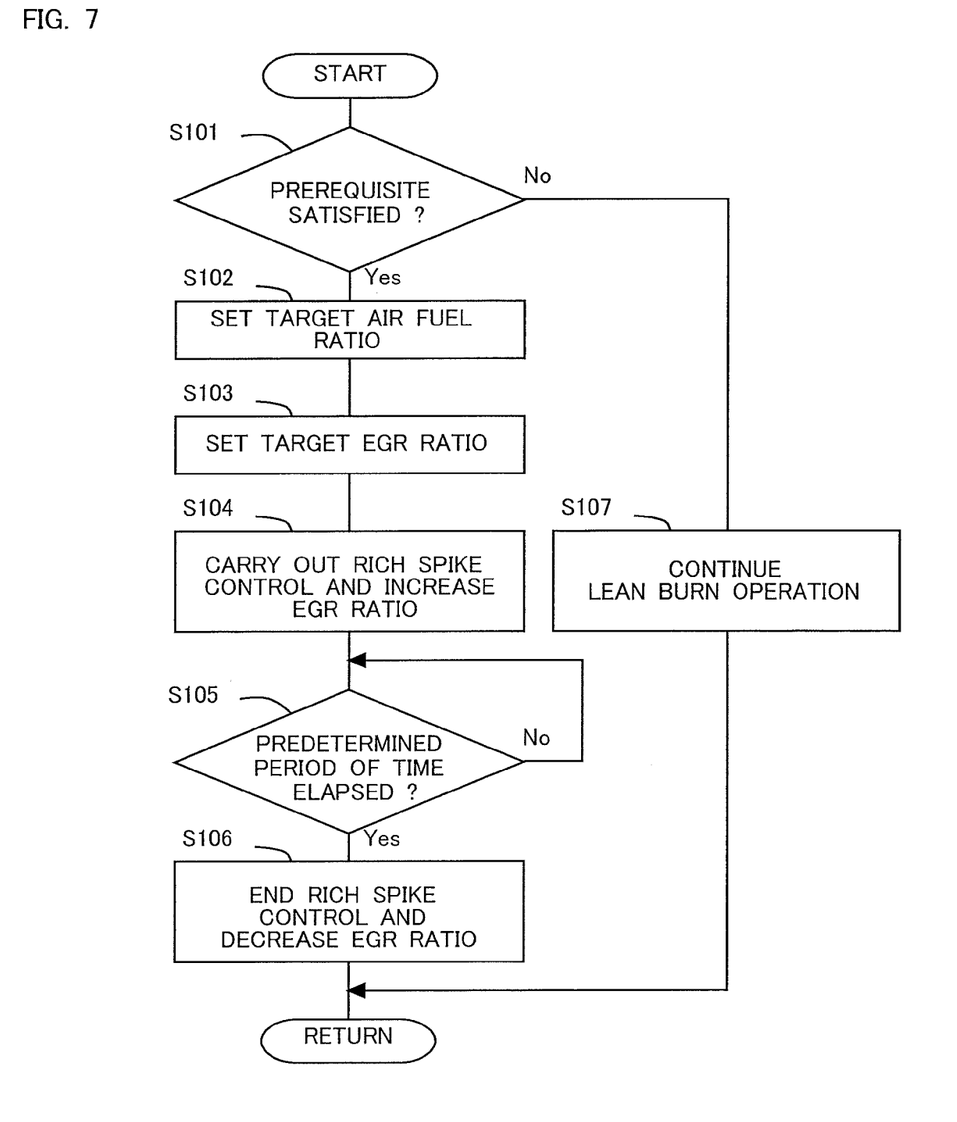
FIG. 7 is a flow chart showing a flow for rich spike control according to the first embodiment.

FIG. 7 is a flow chart showing a flow or routine for rich spike control according to this first embodiment. This routine is carried out by means of the ECU 10 at each predetermined time interval.

In step S101, it is determined whether a prerequisite is satisfied. The prerequisite is a condition which is required in order to carry out rich spike control, and for example, when the amount of NOx stored in the NSR catalyst 4 becomes equal to or larger than a predetermined amount, a determination is made that the prerequisite is satisfied. Moreover, when warming of the internal combustion engine 1 has been completed or the temperature of the NSR catalyst 4 has reached an activation temperature, a determine may be made that the prerequisite is satisfied. In addition, the determination that the prerequisite is satisfied may be made for each predetermined period of time, so as to be able to maintain the amount of NOx stored in the NSR catalyst 4 in the state of being less than the predetermined amount.

In cases where an affirmative determination is made in step S101, the routine advances to step S102. On the other hand, in cases where a negative determination is made in step S101, the routine advances to step S107, where the lean burn operation is continued.

In step S102, the target air fuel ratio is set. This target air fuel ratio is an air fuel ratio which is made a target at the time of rich spike control, and is, for example, a rich air fuel ratio from 12 to 14.1. Here, note that the target air fuel ratio may be corrected according to physical quantities, which affects the ease of carrying out the reduction of NOx, such as the extent of thermal deterioration of the NSR catalyst 4, the extent of sulfur poisoning, the storage amount of NOx, the temperature of the NSR catalyst 4, the temperature of the exhaust gas, the flow speed of the exhaust gas, and the storage amount of oxygen, and so on. In addition, the target air fuel ratio may also be as a value set in advance. Moreover, the target air fuel ratio can also be changed in the course of the rich spike control. For example, in the early stage of the rich spike control, the target air fuel ratio may be made relatively low, and thereafter, the target air fuel ratio may also be made relatively high. As a result of this, it is possible to remove the influence of the oxygen stored in the NSR catalyst 4 quickly.

In step S103, the target EGR ratio is set. This target EGR ratio is an EGR ratio which is made a target at the time of rich spike control. The target EGR ratio is decided according to the target air fuel ratio set in step S102. For example, the relation in any of FIG. 3, FIG. 4 and FIG. 5 has been stored in the ECU 10 in advance. The target EGR ratio is set based on this relation.

In step S104, rich spike control is carried out. In addition, the EGR ratio is increased toward the target EGR ratio.

Here, note that in consideration of a time lag after the EGR valve 22 is operated until the EGR gas is sucked into the internal combustion engine 1, the EGR valve 22 may be operated before the start of the rich spike control. In addition, in order to suppress the deterioration of the combustion state, the EGR valve 22 may be operated after the start of the rich spike control. Moreover, the EGR valve 22 may be operated simultaneously with the start of the rich spike control.

In step S105, it is determined whether a predetermined period of time has elapsed. This predetermined period of time is a period of time until the reduction of the NOx stored in the NSR catalyst 4 is completed. This period of time has been obtained in advance by experiments, simulations or the like, and stored in the ECU 10. Here, note that it is difficult to remove the amount of NOx from the NSR catalyst 4 completely, and such removal also takes time. Thus, a period of time until the NSR catalyst 4 becomes a state in which a certain amount of NOx will remain in the NSR catalyst 4 may be set as the predetermined period of time.

In cases where an affirmative determination is made in step S105, the routine advances to step S106, and on the other hand, in cases where a negative determination is made, the step S105 is carried out again.

In step S106, the rich spike control is ended, and the EGR ratio is decreased to the value before the rich spike control. That is, the internal combustion engine 1 shifts to a lean burn operation. At this time, the target air fuel ratio and the target EGR ratio may be set based on the operating state of the internal combustion engine 1. In addition, the supply of the EGR gas may be stopped. Moreover, similar to the case of step S104, the end of the rich spike control and the decrease of the EGR ratio may be or may not be simultaneous with each other.

As described above, according to this embodiment, the EGR ratio is adjusted according to the target air fuel ratio at the time of the rich spike control, thus making it possible to decrease the amount of discharge of NOx at the time of the rich spike control.

However, when the air fuel ratio becomes too low, the combustion state will deteriorate, and so there will be a fear that a misfire may be caused when the EGR gas is supplied. On the other hand, in such a state where the air fuel ratio is low, the combustion temperature is low, so the generation of NOx is suppressed. That is, in cases where the target air fuel ratio at the time of the rich spike control is less than a specified air fuel ratio, the lower the air fuel ratio, the lower the EGR ratio may also be made. For example, when the air fuel ratio is in a range from 11 to 12, the EGR ratio may be made to be 27%. In cases where the air fuel ratio is lower than this range, the lower the air fuel ratio, the lower the EGR ratio may be made, but in cases where the air fuel ratio is higher than this range, the lower the air fuel ratio, the higher the EGR ratio may also be made. The specified air fuel ratio is an air fuel ratio in which when the target air fuel ratio becomes richer than that, a misfire will occur unless the EGR ratio is decreased. In addition, the prescribed air fuel ratio may be set to be an upper limit value of the air fuel ratio in which a misfire will occur if the EGR ratio is made higher as the target air fuel ratio becomes lower. Here, note that the specified air fuel ratio may be set with a certain amount of margin, so that in the case where the target air fuel ratio is less than the specified air fuel ratio, even if the EGR ratio is made higher as the target air fuel ratio becomes lower, a misfire will not occur immediately.

Here, note that in this embodiment and in the following embodiments, provision can also be made for a turbocharger. In this case, the EGR passage 21 may connect between the exhaust passage 3 at the downstream side of a turbine of the turbocharger and the intake passage 2 at the upstream side of a compressor of the turbocharger, or may connect between the exhaust passage 3 at the upstream side of the turbine and the intake passage 2 at the downstream side of the compressor.

In addition, in cases where the NSR catalyst 4 is in a predetermined activated state, the EGR ratio may be decreased, or the supply of the EGR gas may be stopped. The predetermined activated state referred to herein means a case where the temperature of the NSR catalyst 4 is equal to or less than the activation temperature, or a case where the degree of the deterioration of the NSR catalyst 4 has exceeded an allowable range. That is, in cases where the rate of NOx reduction in the NSR catalyst 4 does not become a desired value, it can be said that the NSR catalyst 4 is in the predetermined activated state. For example, in cases where the rate of NOx reduction is less than a threshold value, it may be assumed that the NSR catalyst 4 is in the predetermined activated state. In such a case, the effect or advantage obtained is greater when increasing the amount of fuel supply to the internal combustion engine 1 so as to raise the temperature of the NSR catalyst 4, than when decreasing the amount of NOx discharged from the internal combustion engine 1. That is, by decreasing the EGR ratio or stopping the supply of the EGR gas so as to increase the amount of fuel, the amount of NOx discharged from the internal combustion engine 1 is increased, but a larger amount of NOx can be removed or reduced in the NSR catalyst 4 due to the rise in the temperature thereof. For this reason, it is possible to decrease the amount of NOx flowing out of the NSR catalyst 4.

Second Embodiment

In the first embodiment, the target air fuel ratio at the time of the rich spike control is constant. On the other hand, in this second embodiment, the target air fuel ratio is made to change in the course of the rich spike control. The other devices, parts and so on are the same as those in the first embodiment, so the explanation thereof is omitted. For example, in the early stage of the rich spike control, the target air fuel ratio may be made relatively low, and thereafter, the target air fuel ratio may also be made relatively high. As a result of this, it is possible to remove the influence of the oxygen stored in the NSR catalyst 4 quickly.

Figure 8:
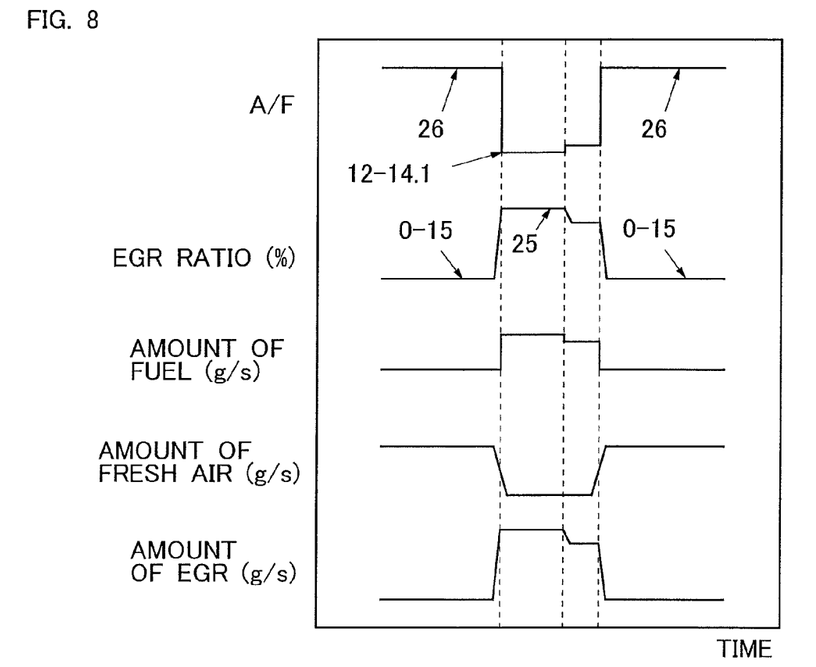
FIG. 8 is a time chart showing the changes over time of the air fuel ratio (A/F), the EGR ratio, the amount of fuel to be supplied to the internal combustion engine, the amount of fresh air, and the amount of EGR, from before the execution of rich spike control until after the execution thereof in the case of changing a target air fuel ratio in the course of the rich spike control.

FIG. 8 is a time chart showing the changes over time of the air fuel ratio (NE), the EGR ratio, the amount of fuel to be supplied to the internal combustion engine 1, the amount of fresh air, and the amount of EGR, from before the execution of rich spike control until after the execution thereof in the case of changing the target air fuel ratio in the course of the rich spike control. The rich spike control is started at a relatively low air fuel ratio, and after that, a shift is made to rich spike control at a relatively high air fuel ratio. At this time, the amount of fuel is made to change, while keeping the amount of fresh air constant. That is, the air fuel ratio is made to increase by decreasing the amount of fuel in the course of the rich spike control. Then, the EGR ratio is made to change according to the change of the target air fuel ratio. At this time, the lower the target air fuel ratio, the higher the target EGR ratio is set to be. Accordingly, the EGR ratio is decreased in the course of the rich spike control. Here, note that in cases where the target air fuel ratio is changed twice or more in the course of the rich spike control, the higher the target air fuel ratio, the lower the target EGR ratio is made similarly.

In this manner, the discharge of NOx can be suppressed even if the target air fuel ratio is changed in the course of the rich spike control. However, the rich spike control is carried out for only a relatively short period of time, so the changeover or shift of the EGR ratio may be difficult due to the response delay of the EGR gas.

Figure 9:
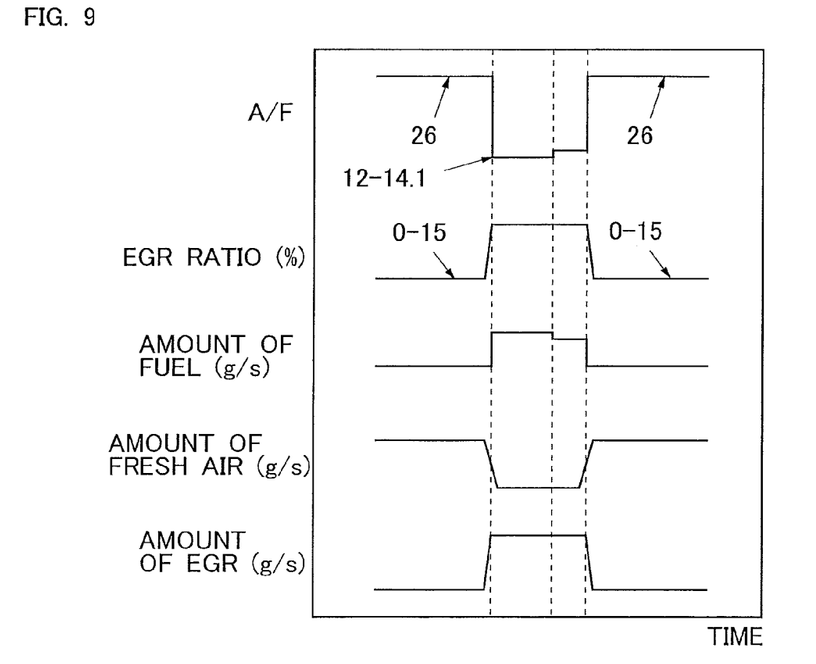
FIG. 9 is a time chart showing the changes over time of the air fuel ratio (A/F), the EGR ratio, the amount of fuel to be supplied to the internal combustion engine, the amount of fresh air, and the amount of EGR, from before the execution of rich spike control until after the execution thereof in the case of changing a target air fuel ratio in the course of the rich spike control but without changing the target EGR ratio.

In contrast to this, FIG. 9 is a time chart showing the changes over time of the air fuel ratio (NF), the EGR ratio, the amount of fuel to be supplied to the internal combustion engine 1, the amount of fresh air, and the amount of EGR, from before the execution of rich spike control until after the execution thereof in the case of changing the target air fuel ratio in the course of the rich spike control but without changing the target EGR ratio. In this manner, even if the target air fuel ratio is made to change in the course of the rich spike control, the EGR ratio may also be made constant in the course of the rich spike control. The target EGR ratio in this case is set according to a higher target air fuel ratio before and after the target air fuel ratio changes during the rich spike control. If the target EGR ratio is set according to a lower target air fuel ratio, there will be a fear that when the target air fuel ratio becomes high, the EGR gas may become excessive, thus causing a misfire. Accordingly, a misfire can be suppressed by setting the target EGR ratio according to the higher target air fuel ratio. This is also the same in cases where at the time of carrying out the rich spike control, the target air fuel ratio is first made relatively high, and thereafter, the target air fuel ratio is made relatively low. That is, in cases where the target air fuel ratio changes in the course of the rich spike control, the target EGR ratio is set according to the highest air fuel ratio. Here, note that in cases where the target air fuel ratio is changed twice or more in the course of the rich spike control, the target EGR ratio is similarly set according to the highest air fuel ratio. Then, the higher the target air fuel ratio, the lower the target EGR ratio is made.

In addition, in cases where the target air fuel ratio changes in the course of the rich spike control, the target EGR ratio may be set according to an average value of the target air fuel ratio during the rich spike control. That is, when the target EGR ratio is set according to the highest air fuel ratio, there is a fear that the amount of discharge of NOx may increase at the time of the lowest air fuel ratio. On the other hand, the amount of discharge of NOx can be decreased by setting the target EGR ratio according to the average value of the target air fuel ratio. In this case, the higher the average value of the target air fuel ratio, the lower the target EGR ratio is made, and the EGR ratio is made constant during the rich spike control.

Third Embodiment

Figure 10:
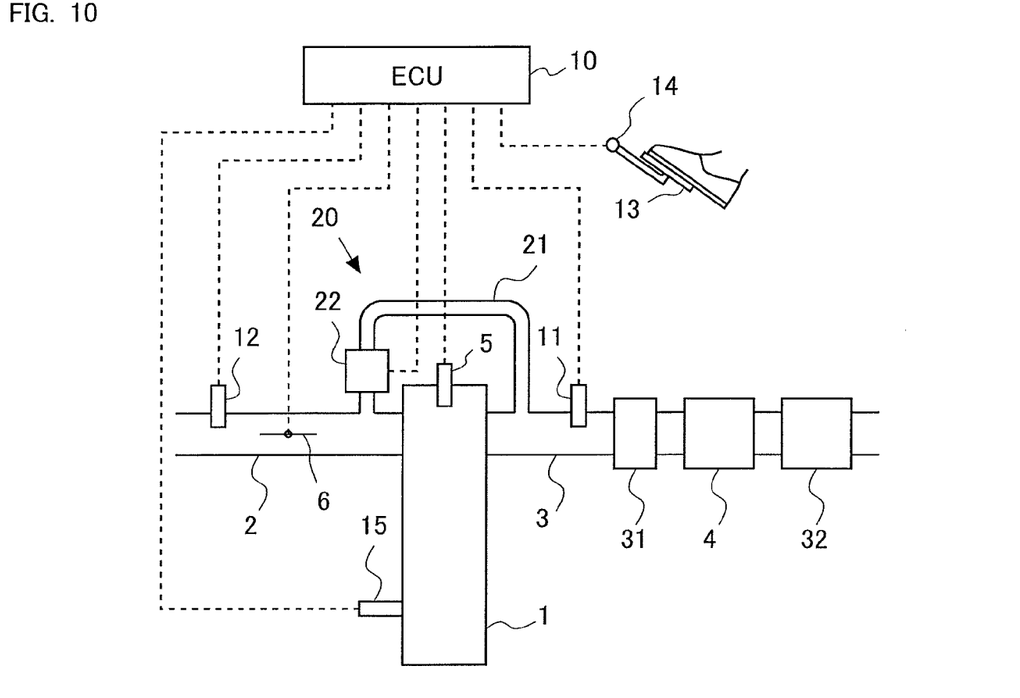
FIG. 10 is a view showing the schematic construction of an internal combustion engine as well as its intake and exhaust systems according to a third embodiment of the present invention.

FIG. 10 is a view showing the schematic construction of an internal combustion engine as well as its intake and exhaust systems according to this third embodiment of the present invention. Mainly, those which are different from the first embodiment will be explained. Here, note that for the same members or components as those in the first embodiment, the same symbols are attached thereto, and an explanation thereof is omitted.

In the middle of the exhaust passage 3, a three-way catalyst 31, the NSR catalyst 4 and an NOx selective catalytic reduction catalyst 32 (hereinafter referred to as an SCR catalyst 32) are sequentially provided in this order from an upstream side.

The three-way catalyst 31 serves to purify or remove NOx, HC and CO with a maximum efficiency at the time when the catalytic atmosphere thereof is at the stoichiometric air fuel ratio. In addition, the three-way catalyst 31 has oxygen storage ability. That is, when the air fuel ratio of an incoming exhaust gas is a lean air fuel ratio, the three-way catalyst 31 occludes or stores an excess of oxygen, whereas when the air fuel ratio of the incoming exhaust gas is a rich air fuel ratio, the three-way catalyst 31 releases or supplies a shortage of oxygen, thereby purifying the exhaust gas. By the action of such oxygen storage ability, the three-way catalyst 31 can purify or remove HC, CO and NOx, even if the air fuel ratio of the incoming exhaust gas is at other than the stoichiometric air fuel ratio.

Here, note that the three-way catalyst 31 can be made to have a function of occluding or storing NOx contained in the incoming exhaust gas when the oxygen concentration of the exhaust gas is high, and of reducing the occluded or stored NOx when the oxygen concentration of the incoming exhaust gas becomes low and when the reducing agent exists.

Here, when the exhaust gas passes through the three-way catalyst 31 or the NSR catalyst 4, the NOx in the exhaust gas may react with HC or $H_2$ to generate ammonia ($NH_3$). For example, if $H_2$ is generated from CO or $H_2O$ in the exhaust gas by a water gas shift reaction or steam reforming reaction, the $H_2$ reacts with NO thereby to generate $NH_3$ in the three-way catalyst 31 or in the NSR catalyst 4.

The SCR catalyst 32 has adsorbed or stored the reducing agent, and carries out selective reduction of NOx by means of the reducing agent thus adsorbed or stored at the time when NOx passes through the SCR catalyst 32. For the reducing agent to be supplied to the SCR catalyst 32, there can be used $NH_3$ generated in the three-way catalyst 31 or the NSR catalyst 4. With the provision of the SCR catalyst 32 at the downstream side of the NSR catalyst 4, the NOx flowing out of the NSR catalyst 4 can be reduced by the SCR catalyst 32.

The EGR passage 21 is connected to the exhaust passage 3 at a location upstream of the three-way catalyst 31. Here, note that the EGR passage 21 is connected to the exhaust passage 3 at a location downstream of the three-way catalyst 31 and upstream of the NSR catalyst 4. In addition, in cases where a turbocharger is provided, the three-way catalyst 31 is arranged in the exhaust passage 3 at the downstream side of a turbine of the turbocharger.

Then, the ECU 10 carries out rich spike control at the time of reducing the NOx stored in the NSR catalyst 4, as in the case of the first embodiment.

However, as described in the first embodiment, when the EGR ratio is made to increase at the time of rich spike control, the amount of discharge of NOx will decrease. However, when NOx is not discharged, $NH_3$ will not be generated in the NSR catalyst 4, so there will be a fear that $NH_3$ may run short or becomes insufficient in the SCR catalyst 32. For this reason, the NOx reduction performance of the SCR catalyst 32 may decrease, immediately after the end of the rich spike control.

Accordingly, in this embodiment, the EGR ratio is made to decrease before the end of the rich spike control. That is, the EGR ratio is made to decrease in the course of the rich spike control. A target EGR ratio set at this time is lower than the target EGR ratio which is set based on FIG. 3, FIG. 4 and FIG. 5. In addition, the target EGR ratio set at this time may be made to decrease to an EGR ratio before the start of the rich spike control, or an EGR ratio according to the operating state of the internal combustion engine 1. Moreover, the supply of the EGR gas may be stopped. Further, the EGR ratio may be adjusted according to the amount of discharge of NOx. In this manner, a period of time in which the lower the target air fuel ratio, the higher the EGR ratio is made is made shorter than a period of time in which the rich spike control is carried out.

As a result of this, NOx is discharged from the internal combustion engine 1 before the end of the rich spike control. In addition, before the end of the rich spike control, CO and HC are contained in the exhaust gas, so that $NH_3$ is generated by the water-gas-shift reaction or the steam reforming reaction in the three-way catalyst 31 or in the NSR catalyst 4. Accordingly, the reducing agent can be supplied to the SCR catalyst 32.

Figure 11:
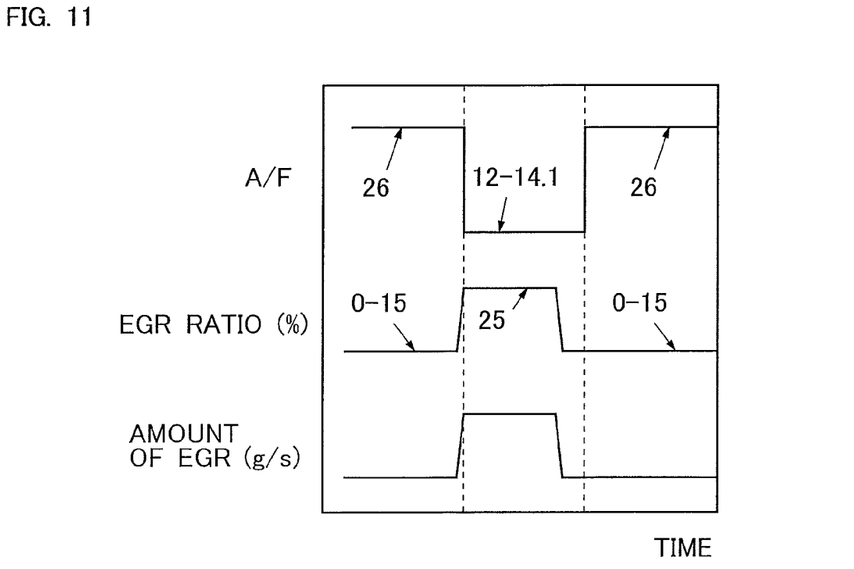
FIG. 11 is a time chart showing the changes over time of the air fuel ratio (A/F), the EGR ratio, and the amount of EGR from before the execution of rich spike control until after the execution thereof in the case of changing a target EGR ratio in the course of the rich spike control.

FIG. 11 is a time chart showing the changes over time of the air fuel ratio (NF), the EGR ratio, and the amount of EGR, from before the execution of rich spike control until after the execution thereof in the case of changing the target EGR ratio in the course of the rich spike control.

Here, note that when the EGR ratio is made to decrease during the rich spike control, the EGR valve 22 may be operated earlier than usual in view of a response delay of the EGR gas.

Figure 12:
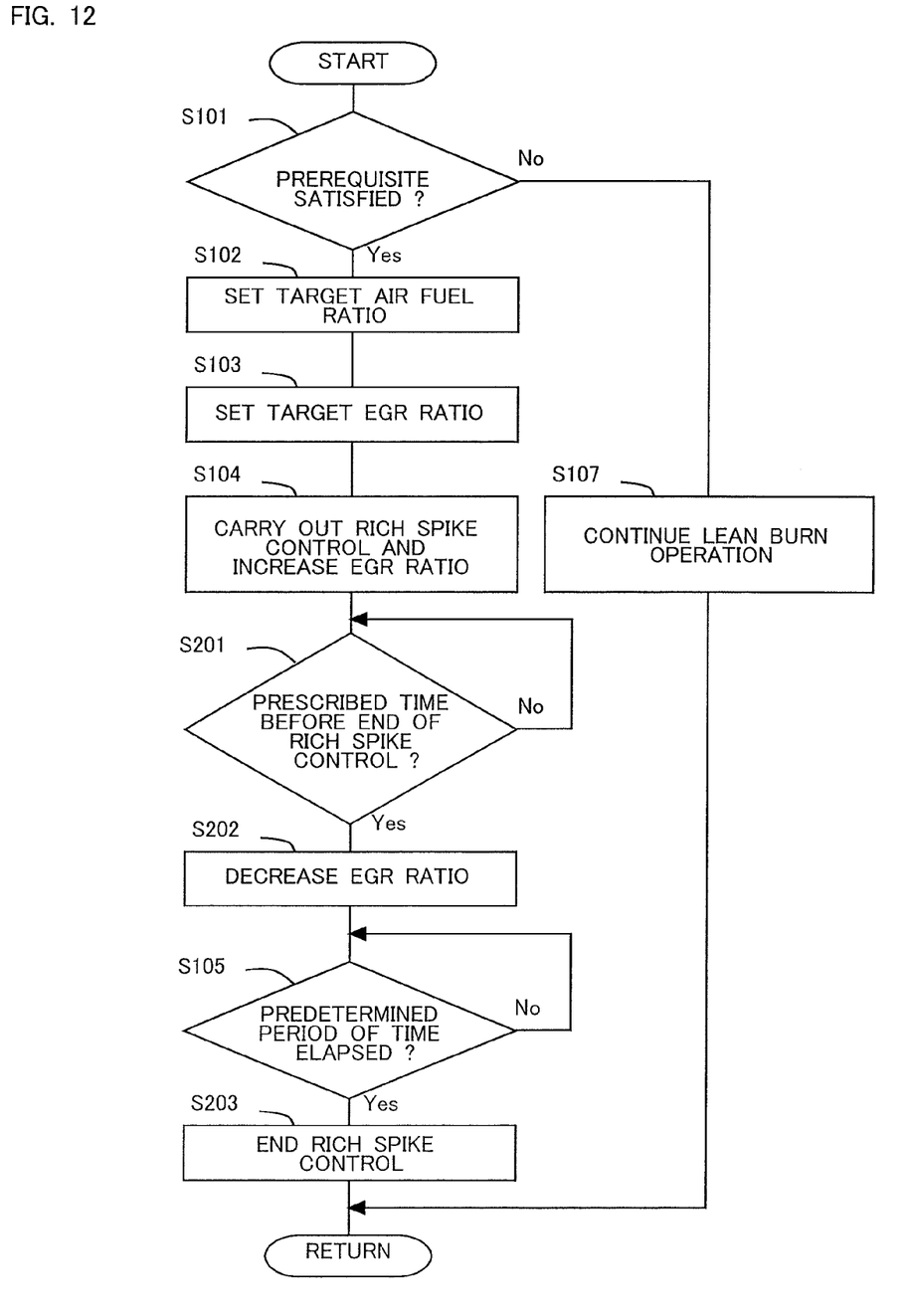
FIG. 12 is a flow chart showing a flow for rich spike control according to the third embodiment.

FIG. 12 is a flow chart showing a flow or routine for rich spike control according to this third embodiment. This routine is carried out by means of the ECU 10 at each predetermined time interval. Here, note that for those steps in which the same processing as in the aforementioned flow chart is carried out, the same symbols are attached and an explanation thereof is omitted.

In this routine, when the processing of step S104 is completed, the routine advances to step S201. In step S201, it is determined whether it is a prescribed time before the end of the rich spike control. The prescribed time referred to herein is a time at which a remaining period of time of the rich spike control becomes a period of time which is required for generating $NH_3$. This prescribed time has been obtained in advance by experiments or simulations, and stored in the ECU 10. Here, note that the prescribed time may be corrected according to the amount of $NH_3$ which has been adsorbed by the SCR catalyst 32.

Then, in cases where an affirmative determination is made in step S201, the routine advances to step S202, and on the other hand, in cases where a negative determination is made, the step S201 is carried out again.

In step S202, the EGR ratio is decreased. For example, the target EGR ratio is returned to a value before the rich spike control. Here, note that the supply of the EGR gas may be stopped.

Then, in cases where an affirmative determination is made in step S105, the routine advances to step S203, where the rich spike control is ended.

As described above, according to this embodiment, the EGR ratio is adjusted according to the target air fuel ratio at the time of the rich spike control, thus making it possible to decrease the amount of discharge of NOx at the time of the rich spike control. In addition, the EGR ratio is made to decrease before the end of the rich spike control, so that $NH_3$ can be supplied to the SCR catalyst 32. As a result of this, it is possible to suppress a decrease in the removal or reduction rate of NOx in the SCR catalyst 32.

Fourth Embodiment

In the first, second and third embodiments, at the time of rich spike control, the EGR ratio is set according to the target air fuel ratio. In contrast to this, in this fourth embodiment, the EGR ratio is set according to the target air fuel ratio, irrespective of whether rich spike control is carried out. In this case, the lower the target air fuel ratio, the higher the target EGR ratio is made. The other devices, parts and so on are the same as those in the first, second and third embodiments, so the explanation thereof is omitted.

Figure 13:
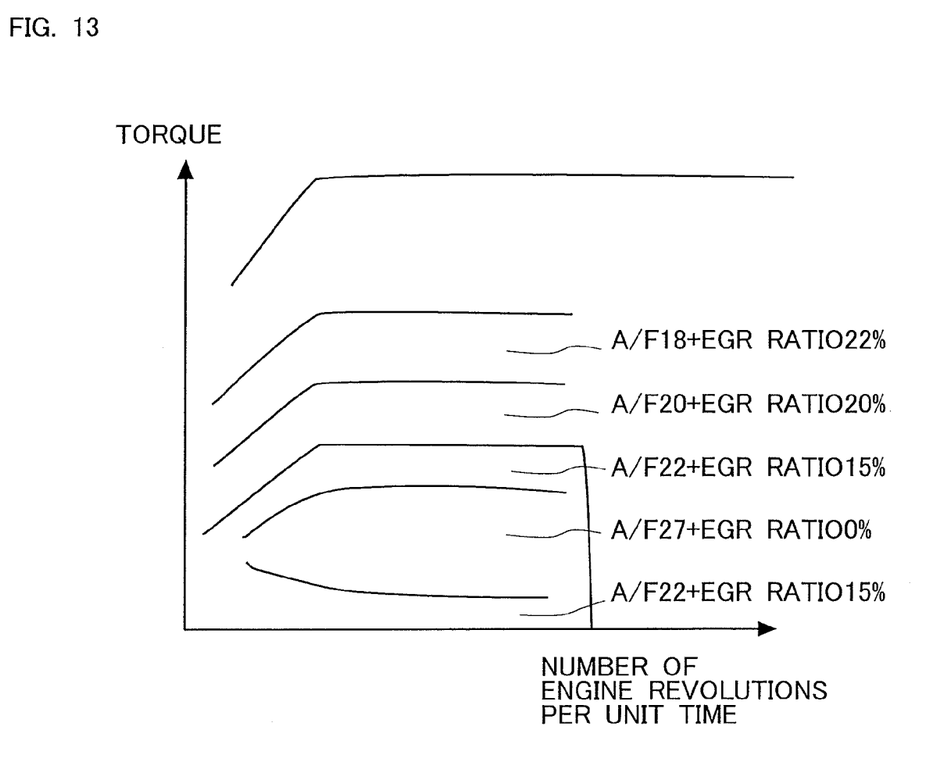
FIG. 13 is a view showing the relation between the number of engine revolutions per unit time, the torque of the internal combustion engine, the target air fuel ratio (A/F), and the target EGR ratio according to a fourth embodiment.

FIG. 13 is a view showing the relation between the number of engine revolutions per unit time, the torque of the internal combustion engine 1, the target air fuel ratio (A/F), and the target EGR ratio according to this fourth embodiment.

In FIG. 13, the operating region of the internal combustion engine 1 is divided into a plurality of subregions, wherein a target air fuel ratio (A/F) and a target EGR ratio are set in each subregion. That is, the target air fuel ratio and the target EGR ratio are set based on the number of engine revolutions per unit time and the torque (this may also be as the engine load, the accelerator opening degree, or the amount of fuel injection). Then, the lower the target air fuel ratio, the higher the target EGR ratio is set to be. Here, note that in a subregion in which the torque is the lowest and the number of engine revolutions per unit time is also low, the air fuel ratio is made low, while supplying the EGR gas, in order to cause the temperature of each catalyst to go up. In a subregion in which the torque is larger than in the above-mentioned subregion, the larger the torque, the lower the target air fuel ratio is made, and at the same time the higher the EGR ratio is also made. This relation can be obtained in advance through experiments or simulations, so as to decrease the amount of discharge of NOx. Then, if the relation shown in FIG. 13 has been stored in the ECU 10, the ECU 10 can decide the air fuel ratio and the EGR ratio based on the number of engine revolutions per unit time and the engine load.

In this manner, the amount of discharge of NOx can also be decreased, by setting the air fuel ratio and the EGR ratio based on the operating state of the internal combustion engine 1 irrespective of whether the rich spike control is carried out.

EXPLANATION OF REFERENCE NUMERALS AND CHARACTERS 1 internal combustion engine
2 intake passage
3 exhaust passage
4 NOx storage reduction catalyst (NSR catalyst)
5 injection valve
6 throttle valve
10 ECU
11 air fuel ratio sensor
12 air flow meter
13 accelerator pedal
14 accelerator opening sensor
15 crank position sensor
20 EGR device
21 EGR passage
22 EGR valve
31 three-way catalyst
32 NOx selective catalytic reduction catalyst (SCR catalyst)

The invention claimed is:
1. An exhaust gas purification apparatus for an internal combustion engine comprising:
an NOx storage reduction catalyst that is arranged in an exhaust passage of the internal combustion engine, stores NOx in exhaust gas, and reduces the NOx when an air fuel ratio of the exhaust gas is equal to or less than a stoichiometric air fuel ratio;

a controller, comprising at least one processor, configured to change the air fuel ratio in said internal combustion engine; and an EGR device that connects between the exhaust passage and an intake passage of said internal combustion engine, and supplies a part of the exhaust gas to the intake passage as an EGR gas;

wherein said controller is further configured, in cases where the NOx stored in said NOx storage reduction catalyst is reduced by changing the air fuel in said internal combustion engine to a target air fuel ratio less than the stoichiometric air fuel ratio, to control said EGR device in such a manner that when the target air fuel ratio is equal to or higher than a specific air fuel ratio which is a rich air fuel ratio, an EGR ratio, which is a ratio of the EGR gas in intake air of the internal combustion engine, increases as the target air fuel ratio decreases, whereas when the target air fuel ratio is less than said specific air fuel ratio, the EGR ratio decreases as the target air fuel ratio decreases.

2. The exhaust gas purification apparatus for an internal combustion engine as set forth in claim 1, wherein said controller is configured to control such that in cases where the fuel air ratio in said internal combustion engine is further made to change in the course of reducing the NOx stored in said NOx storage reduction catalyst by changing the air fuel ratio in said internal combustion engine, the EGR ratio is adjusted according to the highest air fuel ratio in the course of reducing the NOx.

3. The exhaust gas purification apparatus for an internal combustion engine as set forth in claim 1, wherein said controller is configured to control such that in cases where the fuel air ratio in said internal combustion engine is made to further change in the course of reducing the NOx stored in said NOx storage reduction catalyst by changing the air fuel ratio in said internal combustion engine, the EGR ratio is adjusted according to an average value of the air fuel ratio in the course of reducing the NOx.

4. The exhaust gas purification apparatus for an internal combustion engine as set forth in claim 1, wherein said controller is configured to control such that a period of time in which the EGR ratio is increased is made shorter than a period of time in which the NOx stored in said NOx storage reduction catalyst is reduced by changing the air fuel ratio in said internal combustion engine.

5. The exhaust gas purification apparatus for an internal combustion engine as set forth in claim 4, wherein an NOx selective catalytic reduction catalyst for reducing NOx in a selective manner is arranged in the exhaust passage at the downstream side of said NOx storage reduction catalyst; and said controller is configured to control such that within the period of time in which the NOx stored in said NOx storage reduction catalyst is reduced by changing the air fuel ratio in said internal combustion engine, and except the period of time in which the EGR ratio is increased, the EGR ratio is made to decrease more than in the period of time in which the EGR ratio is increased, or the supply of the EGR gas is stopped.

6. The exhaust gas purification apparatus for an internal combustion engine as set forth in claim 5, wherein said controller is configured to control such that NOx is made to be discharged from the internal combustion engine thereby to generate $NH_3$ in said NOx storage reduction catalyst, by decreasing the EGR ratio or stopping the supply of the EGR gas in the course of reducing the NOx stored in said NOx storage reduction catalyst by changing the air fuel ratio in said internal combustion engine, and NOx is made to be reduced in said NOx selective catalytic reduction catalyst by supplying the $NH_3$ to said NOx selective catalytic reduction catalyst.

7. The exhaust gas purification apparatus for an internal combustion engine as set forth in claim 1, wherein said EGR ratio is set according to a combustion limit.

8. The exhaust gas purification apparatus for an internal combustion engine as set forth in claim 1, wherein said controller is configured to control such that a target value of a gas fuel ratio, which is a ratio of an amount of gas and an amount of fuel in a cylinder, is obtained from an air fuel ratio, which is a ratio of an amount of fresh air and the amount of fuel in the cylinder, according to a predetermined relation, and the EGR ratio is adjusted according to the target value of the gas fuel ratio thus obtained.

9. The exhaust gas purification apparatus for an internal combustion engine as set forth in claim 1, wherein said controller is configured to control such that in cases where an activated state of said NOx storage reduction catalyst is a predetermined activated state, the EGR ratio is made to decrease, or the supply of the EGR gas is stopped.

* * * * *